(No Model.)

F. F. UNCKRICH.
NUT LOCK.

No. 448,385.  Patented Mar. 17, 1891.

Attest.
C. W. Bogart,
L. E. Hosea

Inventor.
Frederick F. Unckrich
By L. M. Hosea Atty.

UNITED STATES PATENT OFFICE.

FERDINAND F. UNCKRICH, OF SANDUSKY, OHIO, ASSIGNOR TO WALTER H. STONE, OF SAME PLACE.

NUT-LOCK.

SPECIFICATION forming part of Letters Patent No. 448,385, dated March 17, 1891.

Application filed March 31, 1888. Serial No. 269,156. (No model.)

*To all whom it may concern:*

Be it known that I, FERDINAND F. UNCKRICH, a citizen of the United States, residing at Sandusky, Erie county, Ohio, have invented new and useful Improvements in Nut-Locks, of which the following is a specification.

My invention relates to nut-locks, having particular reference to the use of the same in connection with "fish-joints" of railway-rails, its object being to produce a cheap and efficient device for holding the nut against loosening by rotation under the vibration to which the rails and joint-plates are subjected.

To this end it consists in a holding-matrix preferably formed to inclose the nut as an annulus (which is prevented from rotation in the annulus by the angular contour of the nut) and present a straight external face against the lateral flange of the fish-plate or the bottom flange of the rail as a means of preventing rotation, used in combination with a holding-pin securing the annulus to the nut, all as hereinafter more fully set forth.

My invention is illustrated in the accompanying drawings, in which—

Figures 1, 2:
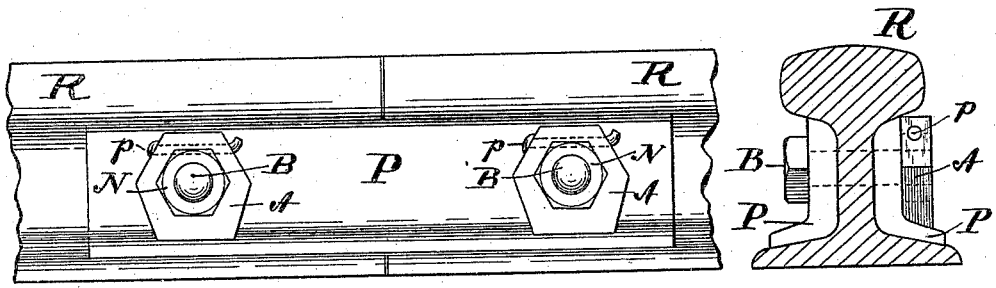
Figure 3:
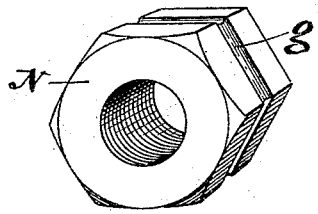
Figure 4:
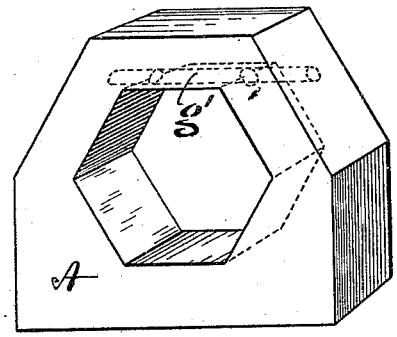
Figure 5:
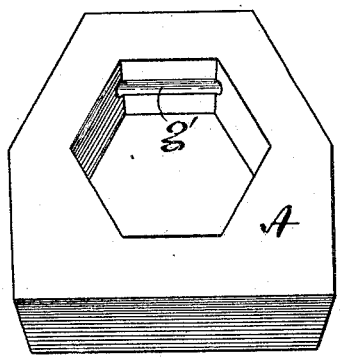

Figure 1 exhibits a rail-joint with my invention applied thereto; Fig. 2, a cross-section of said joint; Fig. 3, a perspective view of the grooved nut detached; Fig. 4, a corresponding perspective of the annulus detached; Fig. 5, a perspective of the annulus showing the interior groove.

Referring now to the drawings, R R designate the railway-rails; P, the fish-plate; B, the bolt passing through the rails and plates from side to side, and N the nut. The plates P are generally bent outward at the bottom, as shown, to fit the contour of the rails; and to secure the nut N from turning, and thereby loosening its hold under the jarring caused by passage of trains, I fit upon and around the nut an annulus A, inclosing the nut and extending to the lower outward flange of the fish-plate P, or to the lower flange of the rail, where no such flange is provided in the fish-plate. To secure the annulus to the nut and retain it in proper relations therewith, I perforate the annulus A from side to side concentrically with the plane of one of its inner faces, so that the perforation forms an open groove $g'$ across said inner face, and forms a corresponding groove $g$ across one of the outer faces of the nut N. When the nut is fitted in its annulus, therefore, a continuous perforation extends through, one diametric half of which, for a portion of its length, is a recess in the nut and the corresponding half in the annulus. Through the perforation thus formed a pin $p$ is driven and upset or turned sidewise at the projecting ends to retain the same in place.

The groove may be formed in each face of the nut, so that upon removing the pin the nut may be tightened by increments of rotation corresponding with the number of faces, or it may be formed only at one or two faces, as desired.

The annulus A may be formed by punching out of plate-iron in the same manner as the nuts themselves, and the perforation subsequently made by drilling, or in any convenient manner. While I prefer to construct the matrix or holding element as a complete annulus, yet it is not absolutely essential that the inclosure of the nut should be complete. For example, the lower portion only, as indicated below the horizontal dotted lines in Fig. 5, may be used, with the pin carried through a perforation concentric with the plane of the lower face of the nut. This construction, however, is inferior on many accounts, not only as having less strength to resist rotation, but also as requiring a closer fit of other parts generally to enable the holding-pin to perform its proper function. The first described form of construction is preferable, as the holding device is thus complete in and of itself, and, as will be obvious, does not depend upon so close a fit of parts to make it effective for the purpose in view. It will be obvious, also, that the annulus may be made complete and sold as an article of manufacture adapted to standard sizes of bolts, and put into use by filing a groove in the nut and inserting a wire when the parts are put together.

I claim as new and desire to secure by Letters Patent of the United States—

1. The improved nut-lock, embodying an open annulus having a plane external face parallel with the axis of the bolt and an internal angular periphery adapted to pass over and embrace the nut, a retaining-pin seated in corresponding opposite grooves in an external face of the nut and an internal face of the annulus in the general plane of the annulus, and a washer-plate adapted to engage over two or more bolts or be otherwise fixed in position, and having a ledge engaging laterally against the plane face of the annulus, substantially as set forth.

2. As a new article of manufacture, a cast or punched open annulus having one or more straight external faces, an internal periphery adapted to pass over and fit the contour of a "nut" and perforated from side to side concentrically with and in continuation of a groove across one of its internal faces, substantially as set forth.

In testimony whereof I have hereunto set my hand in the presence of two subscribing witnesses.

FERDINAND F. UNCKRICH.

Witnesses:
MARY MILLER,
ROSA BAUBACH.